United States Patent
Kuwahara et al.

(10) Patent No.: US 8,504,264 B2
(45) Date of Patent: Aug. 6, 2013

(54) CONTROL DEVICE AND CONTROL METHOD FOR VEHICLE

(75) Inventors: Seiji Kuwahara, Toyota (JP); Toshiya Oishi, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 291 days.

(21) Appl. No.: 13/128,023

(22) PCT Filed: Nov. 12, 2008

(86) PCT No.: PCT/JP2008/070558
§ 371 (c)(1),
(2), (4) Date: May 6, 2011

(87) PCT Pub. No.: WO2010/055554
PCT Pub. Date: May 20, 2010

(65) Prior Publication Data
US 2011/0208394 A1      Aug. 25, 2011

(51) Int. Cl.
*B60W 10/04* (2006.01)
*B60W 10/10* (2012.01)
*F16H 61/02* (2006.01)
(52) U.S. Cl.
USPC ................. 701/54; 477/37; 477/107
(58) Field of Classification Search
None
See application file for complete search history.

(56) References Cited

U.S. PATENT DOCUMENTS

| 6,389,348 | B1 * | 5/2002 | Takagi et al. | 701/58 |
| 6,418,367 | B1 | 7/2002 | Toukura et al. | |
| 6,440,037 | B2 * | 8/2002 | Takagi et al. | 477/37 |
| 2001/0056320 | A1 | 12/2001 | Kato et al. | |

FOREIGN PATENT DOCUMENTS

| JP | 11-193731 A | 7/1999 |
| JP | 2001-105932 A | 4/2001 |
| JP | 2002-005277 A | 1/2002 |

\* cited by examiner

*Primary Examiner* — Michael J Zanelli
(74) *Attorney, Agent, or Firm* — Sughrue Mion, PLLC (57) ABSTRACT

A target gear ratio calculation unit calculates a target gear ratio TGR of a transmission. A setting unit sets a target gear TG according to target gear ratio TGR. A multi-speed transmission control unit controls the transmission according to target gear TG. A target driving force calculation unit calculates target driving force TF of a vehicle. A correction unit corrects target driving force TF according to a gear ratio of the transmission. A conversion unit converts target driving force TF into target engine torque TTE. An engine control unit controls an engine according to target engine torque TTE. Modules used for the engine control unit, the target driving force calculation unit, the conversion unit, and the target gear ratio calculation unit are used in common in a case where the transmission is a multi-speed transmission and in a case where the transmission is a continuously variable transmission. The setting unit and the correction unit are implemented when the transmission is a multi-speed transmission.

20 Claims, 8 Drawing Sheets

CONTROL DEVICE AND CONTROL METHOD FOR VEHICLE

CROSS REFERENCE TO RELATED APPLICATIONS

This application is a National Stage of International Application No. PCT/JP2008/070558 filed Nov. 12, 2008, the contents of all of which are incorporated herein by reference in their entirety.

TECHNICAL FIELD

The present invention relates to a control device and a control method for a vehicle, and in particular to a technique of controlling a transmission according to a target gear ratio or a target input revolution speed, and controlling a driving source according to target torque converted from target driving force using a gear ratio of the transmission.

BACKGROUND ART

Conventionally, continuously variable transmissions (CVTs) capable of continuously changing a gear ratio have been known. Various types of continuously variable transmissions such as belt-type, chain-type, and toroidal-type have been put to practical use. Continuously variable transmissions can shift smoothly, and have a gear ratio with a high degree of freedom. Thus, continuously variable transmissions are generally excellent in fuel consumption properties.

How to control a continuously variable transmission varies depending on the type of vehicle, the type of engine, and the like. Therefore, it is necessary to tune a continuously variable transmission for each type of vehicle and for each type of engine. Thus, vehicle development efficiency may be degraded, or cost of manufacturing a control system may be increased.

In view of such a problem, a vehicle control system that is appropriate for integrated control of a vehicle equipped with a continuously variable transmission, and is suitable for standardization, rationalization, and the like of a plurality of configuration units in the vehicle.

Japanese Patent Laying-Open No. 2002-5277 (Patent Document 1) discloses a vehicle control system in which a transmission gear ratio computation portion computes a command value of a transmission gear ratio of a continuously variable transmission mounted in a vehicle, a torque detection portion detects input torque to the continuously variable transmission, and a transmission gear ratio control portion controls the transmission gear ratio of the continuously variable transmission based on the command value and a detected value. In the vehicle control system, a transmission gear ratio control unit having a function as the transmission gear ratio control portion and one or a plurality of functional units having functions as the transmission gear ratio computation portion and the torque detection portion are configured as units different from each other, and connected via a communication line capable of transmitting data.

According to the vehicle control system described in Japanese Patent Laying-Open No. 2002-5277, computation of the transmission gear ratio is not performed in the transmission gear ratio control unit, and the transmission gear ratio control portion controls the transmission gear ratio of the continuously variable transmission simply based on the command value of the transmission gear ratio and the input torque transmitted to the transmission gear ratio control unit via the communication line. Thereby, even if the transmission gear ratio control unit is mounted in a vehicle of a different type or having a different type of engine, there is no need to tune the transmission gear ratio control unit accordingly. Therefore, the continuously variable transmission and the transmission gear ratio control unit can be configured independently of the vehicle type. Thus, the continuously variable transmission can be standardized (commonalized) in terms of both hardware and software. On the other hand, in the transmission gear ratio computation portion and the torque detection portion, it is required to change control variables and the like used by these portions depending on the vehicle type. If these portions are configured as one functional unit, matters to be changed in terms of both hardware and software can be centralized.

Patent Document 1: Japanese Patent Laying-Open No. 2002-5277

DISCLOSURE OF THE INVENTION

Problems to be Solved by the Invention

To improve development efficiency, however, commonalization of modules and the like configuring control devices is desired not only between continuously variable transmissions but also between a multi-speed transmission in which a gear ratio is changed in a stepwise manner by changing a gear and a continuously variable transmission. However, Japanese Patent Laying-Open No. 2002-5277 does not disclose commonalization of modules between a control device for a multi-speed transmission and a control device for a continuously variable transmission.

One object of the present invention is to achieve commonality of modules between a control device for a multi-speed transmission and a control device for a continuously variable transmission.

Means for Solving the Problems

A control device for a vehicle in accordance with one aspect of the present invention is a control device for a vehicle equipped with a driving source and a transmission coupled to the driving source. The control device includes: a first calculation unit that calculates one of a target gear ratio and a target input revolution speed of the transmission; a setting unit that sets a target gear of the transmission according to one of the target gear ratio and the target input revolution speed; a first control unit that controls the transmission such that a gear of the transmission matches the target gear; a second calculation unit that calculates target driving force of the vehicle; a correction unit that corrects the target driving force according to a gear ratio of the transmission; a conversion unit that converts the corrected target driving force into target torque that is one of output torque of the driving source and input torque of the transmission according to the gear ratio of the transmission; and a second control unit that controls the driving source according to the target torque.

With this configuration, the first calculation unit calculates one of a target gear ratio and a target input revolution speed of the transmission. A continuously variable transmission in which a gear ratio is continuously changed can be controlled by directly using a target gear ratio and a target input revolution speed. Therefore, a control logic, a program, and the like in the first calculation unit can be designed based on the premise that the transmission is a continuously variable transmission. However, to control shifting of a multi-speed transmission in which a gear ratio is changed in a stepwise manner, it is necessary to set a target gear. Thus, a target gear of the transmission is set by the setting unit, according to the target gear ratio or the target input revolution speed calculated in the first calculation unit. The first control unit controls the transmission such that a gear of the transmission matches the target gear. Thereby, the multi-speed transmission in which the gear ratio is changed in a stepwise manner can be controlled using the target gear ratio or the target input revolution speed calculated on the basis of the continuously variable transmission. Thus, the control logic, the program, and the like for the first calculation unit calculating the target gear ratio or the target input revolution speed can be used in common between the multi-speed transmission and the continuously variable transmission. Further, the second calculation unit calculates target driving force of the vehicle to control the driving source. The target driving force is converted by the conversion unit into target torque that is one of output torque of the driving source and input torque of the transmission according to a gear ratio of the transmission. For example, the target driving force is converted into target torque by dividing the product of the target driving force and a radius of rear wheels by the gear ratio. The second control unit controls the driving source according to the target torque. Incidentally, in a vehicle equipped with a continuously variable transmission, driving force can be changed continuously as a gear ratio is changed continuously. In contrast, in a vehicle equipped with a multi-speed transmission, driving force can be changed in a stepwise manner as a gear ratio is changed in a stepwise manner. Therefore, the correction unit corrects the target driving force according to the gear ratio of the transmission such that the target driving force is changed, for example, in a stepwise manner. Thereby, the target driving force considering properties of the multi-speed transmission can be obtained even if the target driving force is calculated on the basis of the continuously variable transmission. Thus, control logics, programs, and the like for the second calculation unit calculating the target driving force, the conversion unit converting the target driving force into the target torque, and the second control unit controlling the driving source can be used in common between the multi-speed transmission and the continuously variable transmission. Hence, commonality of modules can be achieved between a control device for the multi-speed transmission and a control device for the continuously variable transmission.

Preferably, the transmission is a multi-speed transmission.

With this configuration, the control device for the multi-speed transmission can be developed using control logics, programs, and the like designed on the basis of the continuously variable transmission.

Further preferably, the setting unit sets the target gear according to one of the target gear ratio and the target input revolution speed, to have hysteresis.

With this configuration, the target gear is set according to one of the target gear ratio and the target input revolution speed, to have hysteresis. This can avoid hunting of the target gear.

Further preferably, the setting unit sets the target gear according to one of the target gear ratio and the target input revolution speed, such that the target gear is changed if an amount of change of one of the target gear ratio and the target input revolution speed after shifting of the transmission exceeds a threshold value.

With this configuration, the target gear is changed if an amount of change of one of the target gear ratio and the target input revolution speed after shifting of the transmission exceeds a threshold value. Thereby, the target gear having a gear ratio that is changed in a stepwise manner can be set from the gear ratio or the target input revolution speed that is continuously changed.

Further preferably, the threshold value in a case where one of the target gear ratio and the target input revolution speed is increased is different from the threshold value in a case where one of the target gear ratio and the target input revolution speed is decreased.

With this configuration, it is possible to vary the amount of change of the target gear ratio or the target input revolution speed when the target gear is changed, in the case of up-shifting and in the case of down-shifting. Thus, the target gear can be set to have hysteresis. This can avoid hunting of the target gear.

Further preferably, the setting unit sets the target gear according to one of the target gear ratio and the target input revolution speed, such that the target gear is changed if an amount of change of at least one of an accelerator position and a vehicle speed after shifting of the transmission exceeds a threshold value.

With this configuration, the target gear is changed if an amount of change of at least one of an accelerator position and a vehicle speed after shifting of the transmission exceeds a threshold value. Thereby, the target gear having gear ratio that is changed in a stepwise manner can be set from the gear ratio or the target input revolution speed that is continuously changed.

Further preferably, the threshold value in a case where one of the target gear ratio and the target input revolution speed is increased is different from the threshold value in a case where one of the target gear ratio and the target input revolution speed is decreased.

With this configuration, it is possible to vary the amount of change of the accelerator position or the vehicle speed when the target gear is changed, in the case of up-shifting and in the case of down-shifting. Thus, the target gear can be set to have hysteresis. This can avoid hunting of the target gear.

Further preferably, the setting unit sets the target gear according to one of the target gear ratio and the target input revolution speed, such that the target gear is changed if a difference between the target gear ratio and a gear ratio corresponding to the target gear or a difference between the target input revolution speed and an input revolution speed corresponding to the target gear exceeds a threshold value.

With this configuration, the target gear is changed if a difference between the target gear ratio and a present gear ratio or a difference between the target input revolution speed and a present input revolution speed is increased. This can limit a state where shifting is not performed despite a change in the target gear ratio or the target input revolution speed. Therefore, this can limit deviation of a present control state from a target control state.

Further preferably, the threshold value is changed according to at least one of a vehicle speed, an accelerator position, the target gear ratio, and the target input revolution speed.

With this configuration, it is possible to change a period for which the state where shifting is not performed despite a change in the target gear ratio or the target input revolution speed is continued, using one of a vehicle speed, an accelerator position, the target gear ratio, and the target input revolution speed as a parameter. Therefore, the target gear can be set in a manner with a high degree of freedom.

Further preferably, when the transmission is controlled to shift up, the correction unit corrects the target driving force to be decreased.

With this configuration, when the transmission is controlled to shift up, the target driving force is corrected to be decreased. Thereby, the target driving force decreased in a stepwise manner by up-shifting can be obtained. Therefore, the target driving force having properties of the multi-speed transmission can be obtained.

Further preferably, after the correction unit corrects the target driving force to be decreased, the correction unit corrects the target driving force such that the target driving force after correction matches the target driving force before correction.

With this configuration, the target driving force after correction can finally match the target driving force before correction.

Further preferably, after the correction unit corrects the target driving force to be decreased, the correction unit corrects the target driving force such that the target driving force after correction is decreased as an accelerator position lowers, and matches the target driving force before correction.

This configuration can prevent an unnatural change that the target driving force is increased despite lowering of the accelerator position.

Further preferably, when the transmission is controlled to shift down, the correction unit corrects the target driving force to be increased.

With this configuration, when the transmission is controlled to shift down, the target driving force is corrected to be increased. Thereby, the target driving force increased in a stepwise manner by down-shifting can be obtained. Therefore, the target driving force having properties of the multi-speed transmission can be obtained.

Further preferably, the correction unit corrects the target driving force to be increased by an amount of increase according to the gear ratio of the transmission.

With this configuration, since suitable driving force may be different for each gear ratio, the target driving force is corrected to be increased by an amount of increase according to the gear ratio of the transmission. Thereby, the target driving force more reflecting the properties of the multi-speed transmission can be obtained.

Further preferably, after the correction unit corrects the target driving force to be increased, the correction unit corrects the target driving force such that the target driving force after correction matches the target driving force before correction.

With this configuration, the target driving force after correction can finally match the target driving force before correction.

Further preferably, when the transmission is controlled to shift down, the correction unit corrects the target driving force such that an amount of increase of the target driving force is decreased.

With this configuration, when the transmission is controlled to shift down, the target driving force is corrected such that an amount of increase of the target driving force is decreased. Thereby, an amount of increase of the target driving force before down-shifting is considered as an amount by which the target driving force is increased by down-shifting, and an amount of change of the target driving force after down-shifting is decreased. Accordingly, the target driving force that can be changed in a substantially stepwise manner can be obtained. Therefore, the target driving force having properties of the multi-speed transmission can be obtained.

Further preferably, after the correction unit corrects the target driving force such that the amount of increase of the target driving force is decreased, the correction unit corrects the target driving force such that the target driving force after correction matches the target driving force before correction.

With this configuration, the target driving force after correction can finally match the target driving force before correction.

Further preferably, the transmission is a continuously variable transmission. Activation of the setting unit is inhibited. The first control unit controls the continuously variable transmission such that a gear ratio of the continuously variable transmission matches the target gear ratio, or such that an input revolution speed of the continuously variable transmission matches the target input revolution speed. Activation of the correction unit is inhibited. The conversion unit converts the target driving force calculated by the second calculation unit, instead of the target driving force corrected by the correction unit, into the target torque that is one of the output torque of the driving source and the input torque of the transmission according to the gear ratio of the continuously variable transmission.

With this configuration, functions of components other than components necessary to control the continuously variable transmission are disabled. Thereby, control devices for the multi-speed transmission and the continuously variable transmission can have a common configuration.

Effects of the Invention

According to the present invention, commonality of modules between the control device for the multi-speed transmission and the control device for the continuously variable transmission can be achieved.

DESCRIPTION OF THE REFERENCE SIGNS

100: engine, 102: auxiliary machine, 104: electronic throttle valve, 200: torque converter, 300: transmission, 400: propeller shaft, 500 differential gear, 600: rear wheel, 700: engine ECU, 702: engine control unit, 710: ECT-ECU, 712: target driving force calculation unit, 714: conversion unit, 716: target gear ratio calculation unit, 718: continuously variable transmission control unit, 720: setting unit, 722: correction unit, 724: multi-speed transmission control unit, 726: transmission control unit, 800: throttle opening position sensor, 802: air flow meter, 804: engine revolution speed sensor, 806: water temperature sensor, 810: accelerator position sensor, 812: accelerator pedal, 820: position switch, 822:

shift lever, 830: input revolution speed sensor, 832: output revolution speed sensor, 834: oil temperature sensor.

BEST MODES FOR CARRYING OUT THE INVENTION

Hereinafter, an embodiment of the present invention will be described with reference to the drawings. In the following description, the same parts are given the same reference numerals. Names and functions thereof are all the same. Therefore, a detailed description thereof will not be repeated.

Figure 1:
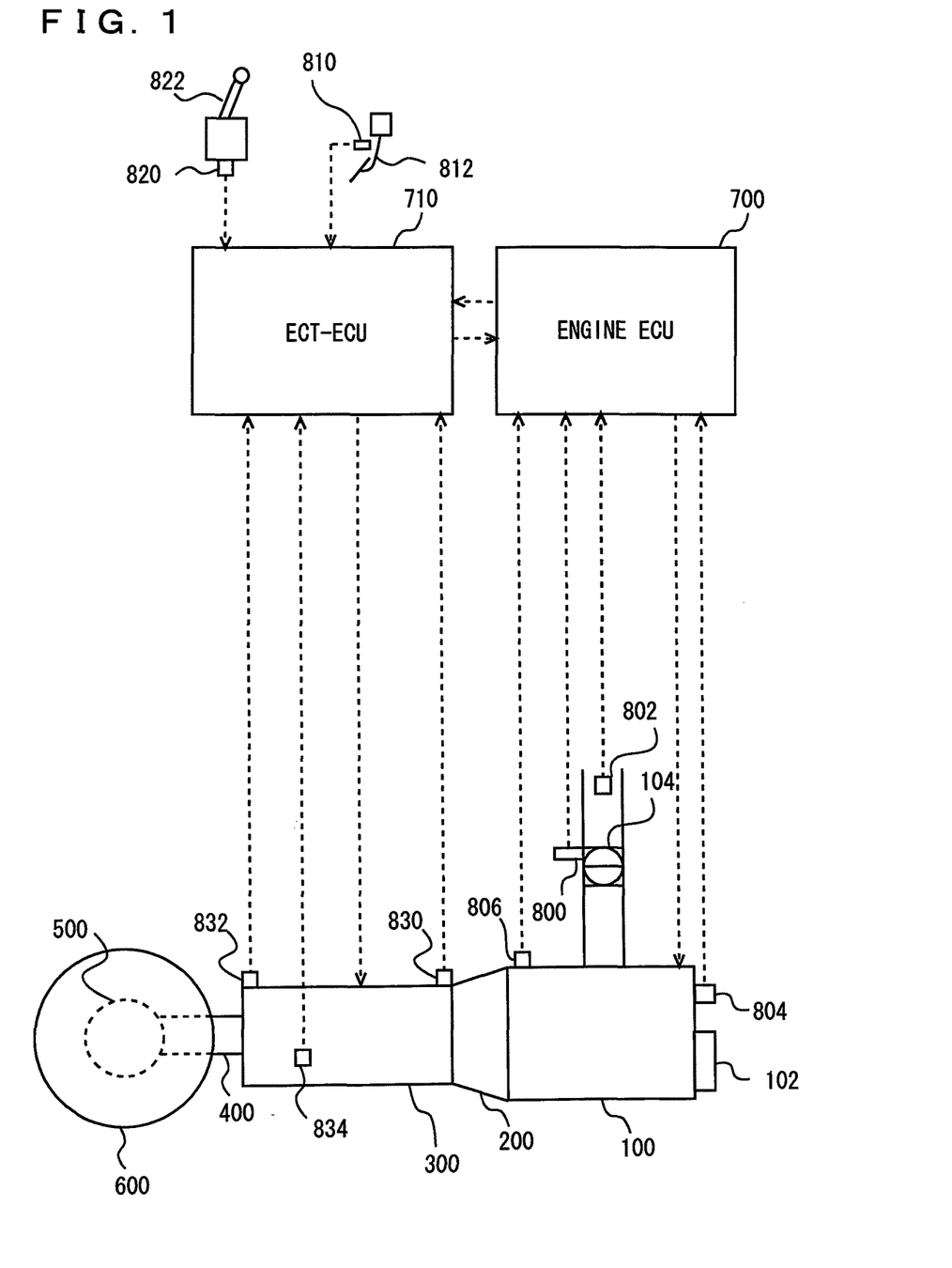
FIG. 1 is a schematic configuration diagram showing a powertrain of a vehicle.

Referring to FIG. 1, a vehicle equipped with a control device according to the embodiment of the present invention will be described. This vehicle is an FR (Front engine Rear drive) vehicle. It is to be noted that this vehicle may be a vehicle other than the FR vehicle.

The vehicle includes an engine 100, a torque converter 200, a transmission 300, a propeller shaft 400, a differential gear 500, rear wheels 600, an engine ECU (Electronic Control Unit) 700, and an ECT (Electronic Controlled Transmission)-ECU 710.

Engine 100 is an internal combustion engine for combusting a mixture of fuel injected from an injector (not shown) and air in a combustion chamber of a cylinder. A piston in the cylinder is pushed down by the combustion, and a crankshaft is rotated. Auxiliary machines 102 such as an alternator and an air conditioner are driven by engine 100.

The amount of air to be taken in engine 100 is adjusted by an electronic throttle valve 104. That is, output torque of engine 100 (engine torque TE) is changed in accordance with a throttle opening position or the like. It is to be noted that the amount of air to be taken in engine 100 may be adjusted by a variable valve lift system that changes a lift amount or opening/closing phase of an intake valve (not shown) or an exhaust valve (not shown), instead of or in addition to electronic throttle valve 104.

Further, a motor may be used as a driving source instead of or in addition to engine 100. Alternatively, a diesel engine may be used. In the diesel engine, output torque is changed in accordance with the valve opening time of the injector (the actuated amount), that is, a fuel injection amount.

Transmission 300 is coupled to engine 100 with torque converter 200 interposed therebetween. Transmission 300 may be a multi-speed transmission in which desired gears are formed using a planetary gear unit and thereby a gear ratio is changed in a stepwise manner, or may be a continuously variable transmission continuously changing a gear ratio. Further, a multi-speed transmission configured by a constant-meshing type gear shifted by an oil hydraulic actuator or an electric motor may be used.

Driving force output from transmission 300 is transmitted to rear wheels 600 as driving wheels, through propeller shaft 400 and differential gear 500.

Engine ECU 700 controls engine 100. ECT-ECU 710 controls transmission 300. Engine ECU 700 and ECT-ECU 710 are connected such that they can mutually transmit and receive signals. It is to be noted that one ECU integrating engine ECU 700 and ECT-ECU 710 may be provided.

Engine ECU 700 and ECT-ECU 710 receive signals from a throttle opening position sensor 800, an air flow meter 802, an engine revolution speed sensor 804, a water temperature sensor 806, an accelerator position sensor 810, a position switch 820, an input revolution speed sensor 830, an output revolution speed sensor 832, an oil temperature sensor 834, and the like.

Throttle opening position sensor 800 detects an opening position of electronic throttle valve 104 adjusted by an actuator. Air flow meter 802 detects the amount of air to be taken in engine 100. Engine revolution speed sensor 804 detects a revolution speed of an output shaft (crankshaft) of engine 100 (hereinafter also referred to as engine revolution speed NE). Water temperature sensor 806 detects a temperature of cooling water for engine 100 (a water temperature).

Accelerator position sensor 810 detects a position of an accelerator pedal 812 (hereinafter also referred to as an accelerator position). Position switch 820 detects a position of a shift lever 822.

Input revolution speed sensor 830 detects an input revolution speed NI of transmission 300 (a turbine revolution speed NT of torque converter 200). Output revolution speed sensor 832 detects an output revolution speed NO of transmission 300. In the present embodiment, a vehicle speed is calculated, for example, by dividing output revolution speed NO of transmission 300 by a gear ratio of differential gear 500, and multiplying the result by the circumference of rear wheels 600. It is to be noted that output revolution speed NO may be used directly, instead of the vehicle speed.

Oil temperature sensor 834 detects a temperature of oil (an oil temperature) used for actuating and lubricating transmission 300 (ATF: Automatic Transmission Fluid).

Engine ECU 700 and ECT-ECU 710 control equipment so that the vehicle is in a desired traveling state, based on the signals transmitted from throttle opening position sensor 800, air flow meter 802, engine revolution speed sensor 804, water temperature sensor 806, accelerator position sensor 810, position switch 820, input revolution speed sensor 830, output revolution speed sensor 832, oil temperature sensor 834, and the like, and a map and a program stored in a ROM (Read Only Memory). It is to be noted that the program to be executed by engine ECU 700 or ECT-ECU 710 may be recorded in a recording medium such as a CD (Compact Disc) and a DVD (Digital Versatile Disc) and distributed to the market.

Figure 2:
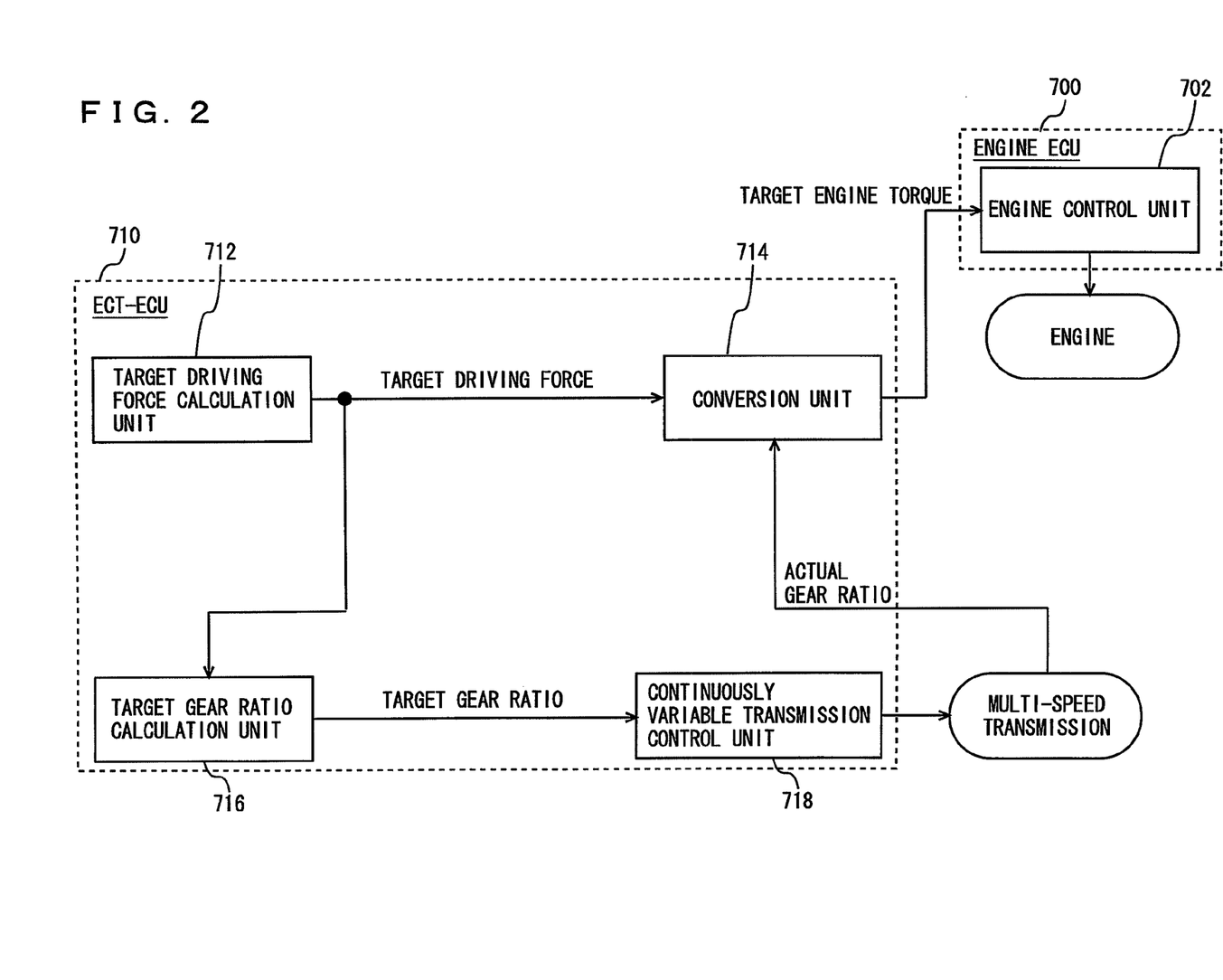
FIG. 2 is a functional block diagram showing a configuration of a control system suitable for a case where a transmission is a continuously variable transmission.

Referring to FIG. 2, a configuration of a control system suitable for a case where transmission 300 is a continuously variable transmission will be described. It is to be noted that functions of components described below may be realized by hardware or may be realized by software.

In engine ECU 700, an engine control unit 702 is implemented. Engine control unit 702 controls engine 100 such that actual engine torque TE matches target engine torque TTE received from ECT-ECU 710. More specifically, a throttle opening position, ignition timing, and the like are controlled such that actual engine torque TE matches target engine torque TTE.

Instead of target engine torque TTE, target turbine torque TTT, that is, target input torque of transmission 300 may be set, and engine 100 may be controlled such that actual turbine torque (input torque of transmission 300) TT matches target turbine torque TTT.

In ECT-ECU 710, a target driving force calculation unit 712, a conversion unit 714, a target gear ratio calculation unit 716, and a continuously variable transmission control unit 718 are implemented.

Target driving force calculation unit 712 calculates (sets) target driving force TF of the vehicle according to a map having, for example, the accelerator position and the vehicle speed as parameters. The map used to calculate target driving force TF is prepared beforehand by a designer based on results of, for example, simulations and experiments. A method of calculating target driving force TF is not limited thereto.

Conversion unit 714 converts target driving force TF into target engine torque TTE. For example, conversion unit 714 converts target driving force TF into target engine torque TTE by dividing the product of target driving force TF and rear wheels 600 by the gear ratio of differential gear 500 and a gear ratio of transmission 300.

Instead of target engine torque TTE, target turbine torque TTT may be calculated. Further, since a well-known common technique may be utilized as a method of converting driving force into torque, the detailed description thereof will not be repeated here.

Target gear ratio calculation unit 716 calculates (sets) a target gear ratio TGR of transmission 300 according to a map having, for example, the vehicle speed and target driving force TF as parameters. The map used to calculate target gear ratio TGR is prepared beforehand by a designer based on results of, for example, simulations and experiments. A method of calculating target gear ratio TGR is not limited thereto.

Further, instead of target gear ratio TGR, a target input revolution speed TNI of transmission 300 (a target turbine revolution speed TNT) may be calculated. Furthermore, target gear ratio TGR may be calculated by dividing target input revolution speed TNI of transmission 300 (target turbine revolution speed TNT) by a present value of output revolution speed NO of transmission 300.

As described later, modules (such as a control logic and a program) used for target gear ratio calculation unit 716 are common to those of a control system in the case where transmission 300 is a multi-speed transmission, except for coefficients, constants, and the like. However, target gear ratio calculation unit 716 is designed on the basis of a continuously variable transmission.

Continuously variable transmission control unit 718 controls transmission 300 according to target gear ratio TGR. More specifically, continuously variable transmission control unit 718 controls transmission 300 such that an actual gear ratio matches target gear ratio TGR.

It is to be noted that, if target input revolution speed TNI of transmission 300 (target turbine revolution speed TNT) is calculated instead of target gear ratio TGR, transmission 300 may be controlled such that actual input revolution speed NI matches target input revolution speed TNI.

Figure 3:
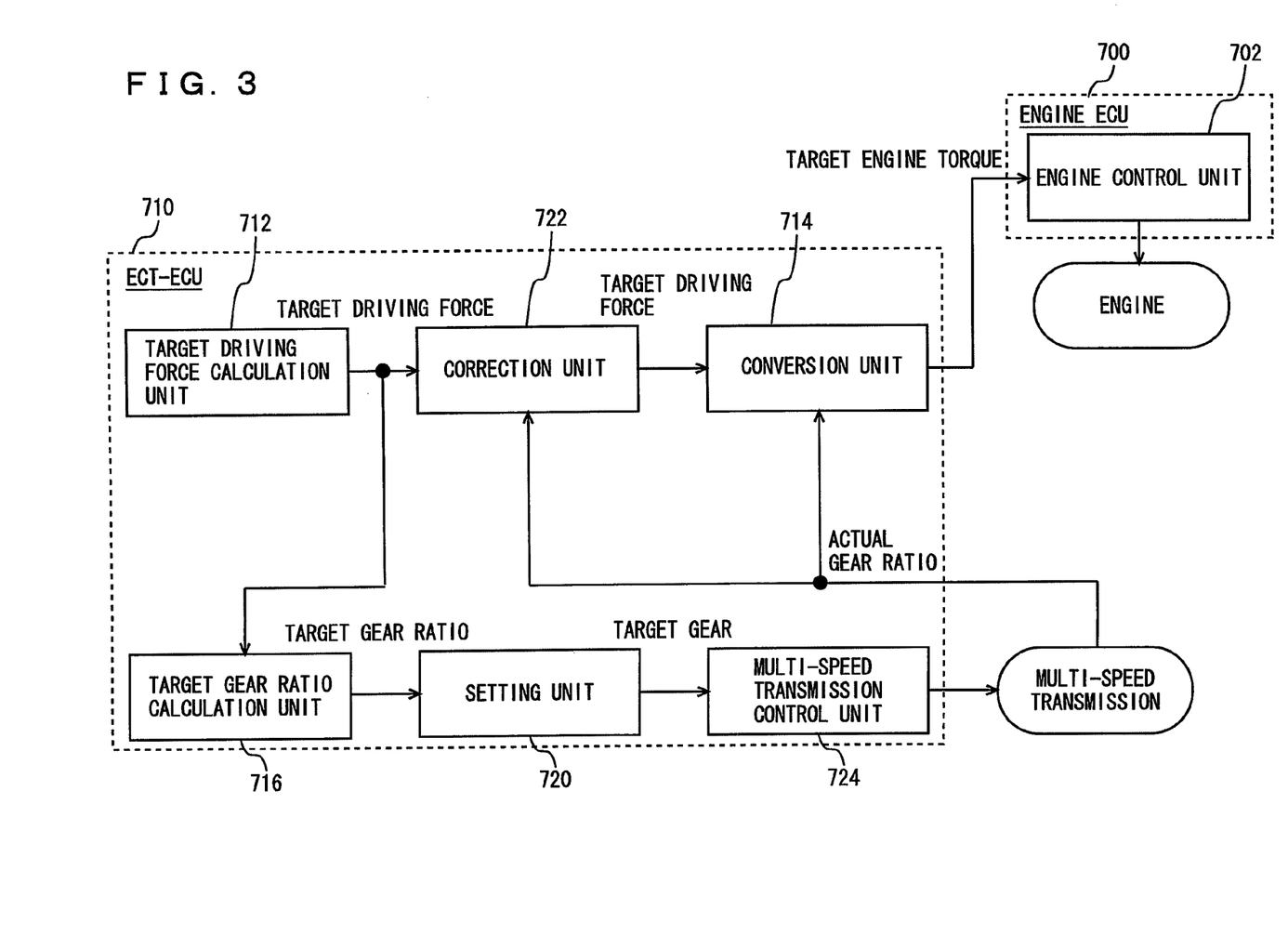
FIG. 3 is a functional block diagram showing a configuration of a control system suitable for a case where a transmission is a multi-speed transmission.

Referring to FIG. 3, a configuration of a control system suitable for a case where transmission 300 is a multi-speed transmission will be described. It is to be noted that functions of components described below may be realized by hardware or may be realized by software.

In engine ECU 700, engine control unit 702 described above is implemented. That is, modules used for engine control unit 702 are used in common in the case where transmission 300 is a multi-speed transmission and in the case where transmission 300 is a continuously variable transmission, except for coefficients, constants, and the like.

In ECT-ECU 710, a setting unit 720 and a correction unit 722 are implemented in addition to target driving force calculation unit 712, conversion unit 714, and target gear ratio calculation unit 716 described above. Further, a multi-speed transmission control unit 724 is implemented instead of continuously variable transmission control unit 718 described above.

That is, modules used for target driving force calculation unit 712, conversion unit 714, and target gear ratio calculation unit 716 are used in common in the case where transmission 300 is a multi-speed transmission and in the case where transmission 300 is a continuously variable transmission, except for coefficients, constants, and the like.

Setting unit 720 sets a target gear TG of transmission 300 according to target gear ratio TGR. It is to be noted that, if target input revolution speed TNI of transmission 300 (target turbine revolution speed TNT) is calculated instead of target gear ratio TGR, target gear ratio TGR may be temporarily calculated by dividing target input revolution speed TNI by the present value of output revolution speed NO of transmission 300, and then target gear TG of transmission 300 may be set according to target gear ratio TGR.

Setting unit 720 sets target gear TG according to target gear ratio TGR, to have hysteresis.

Figure 4:
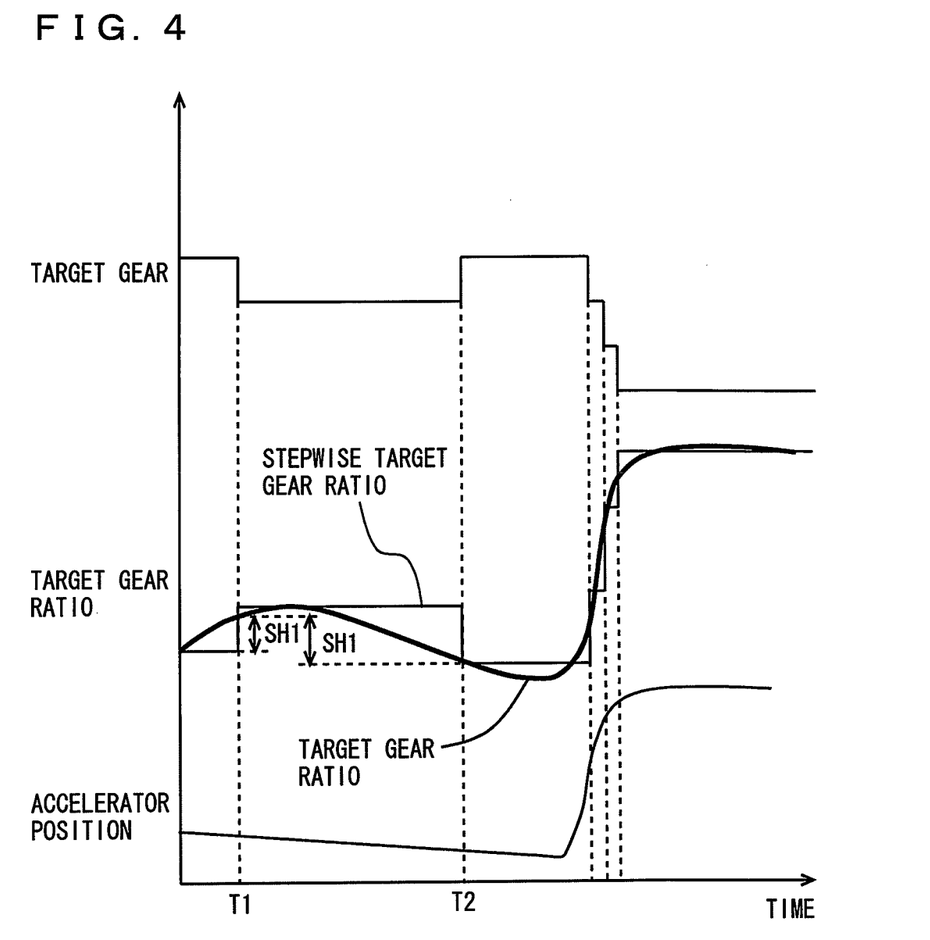
FIG. 4 is a view showing a target gear ratio TGR and a target gear TG.

More specifically, as shown in FIG. 4, target gear TG is set according to target gear ratio TGR, such that target gear TG is changed if an amount of change of target gear ratio TGR after shifting of transmission 300 exceeds a threshold value.

For example, if an amount of increase of target gear ratio TGR exceeds a threshold value at time T1 in FIG. 4, target gear TG is changed to a one-step lower gear such that transmission 300 shifts down.

If an amount of decrease of target gear ratio TGR exceeds a threshold value SH1 at time T2 in FIG. 4, target gear TG is changed to a one-step higher gear such that transmission 300 shifts up.

Threshold value SH1 in the case where target gear ratio TGR is increased is different from threshold value SH1 in the case where target gear ratio TGR is decreased. For example, threshold value SH1 used in the case where target gear ratio TGR is increased is smaller than threshold value SH1 used in the case where target gear ratio TGR is decreased.

That is, the amount of change of target gear ratio TGR required to cause transmission 300 to shift down is smaller than the amount of change thereof required to cause transmission 300 to shift up.

It is to be noted that, instead of target gear ratio TGR, target input revolution speed TNI (target turbine revolution speed TNT) may be used.

Further, setting unit 720 sets target gear TG according to target gear ratio TGR, such that target gear TG is changed if an amount of change of at least one of the accelerator position and the vehicle speed after shifting of transmission 300 exceeds a threshold value SH2.

For example, a gear having a gear ratio that is closest to target gear ratio TGR at a time point when the amount of change of at least one of the accelerator position and the vehicle speed after shifting of transmission 300 exceeds threshold value SH2 is set as target gear TG.

Threshold value SH2 in the case where target gear ratio TGR is increased is different from threshold value SH2 in the case where target gear ratio TGR is decreased. For example, threshold value SH2 used in the case where target gear ratio TGR is increased is smaller than threshold value SH2 used in the case where target gear ratio TGR is decreased.

Further, setting unit 720 sets target gear TG according to one of target gear ratio TGR and target input revolution speed TNI, such that target gear TG is changed if a difference between target gear ratio TGR and a gear ratio corresponding to target gear TG, in other words, a difference between target input revolution speed TNI and input revolution speed NI corresponding to target gear TG, exceeds a threshold value SH3.

For example, if the difference between target gear ratio TGR and the gear ratio corresponding to target gear TG (an absolute value of the difference) exceeds threshold value SH3 due to an increase in target gear ratio TGR, target gear TG is changed to a one-step lower gear such that transmission 300 shifts down.

If the difference between target gear ratio TGR and the gear ratio corresponding to target gear TG (the absolute value of the difference) exceeds threshold value SH3 due to a decrease in target gear ratio TGR, target gear TG is changed to a one-step higher gear such that transmission 300 shifts up.

Threshold value SH3 is changed according to at least one of the vehicle speed, the accelerator position, target gear ratio TGR, and target input revolution speed TNI. For example, higher threshold value SH3 is used with an increase in the vehicle speed. Higher threshold value SH3 is used with an increase in the accelerator position.

Figure 5:
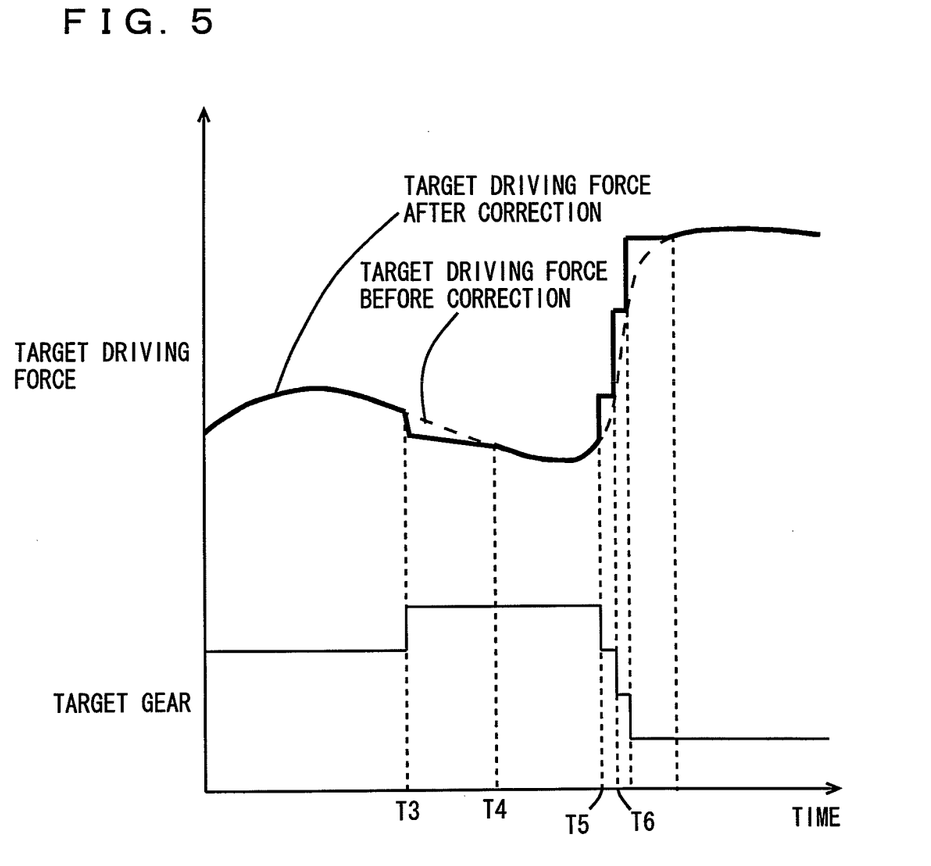
FIG. 5 is a view showing target driving force TF (part 1).

Turning back to FIG. 3, correction unit 722 corrects target driving force TF according to a present value of the gear ratio of transmission 300. As shown in FIG. 5, when transmission 300 is controlled to shift up, correction unit 722 corrects target driving force TF calculated to be changed continuously, to be decreased in a stepwise manner.

Further, after correction unit 722 corrects target driving force TF to be decreased at time T3 shown in FIG. 5, correction unit 722 corrects target driving force TF such that target driving force TF after correction matches target driving force TF before correction at time T4.

If the accelerator position lowers, target driving force TF is corrected such that target driving force TF after correction is decreased as the accelerator position lowers, and finally matches target driving force TF before correction. That is, target driving force TF is corrected not to be increased while the accelerator position is lowering.

Figure 6:
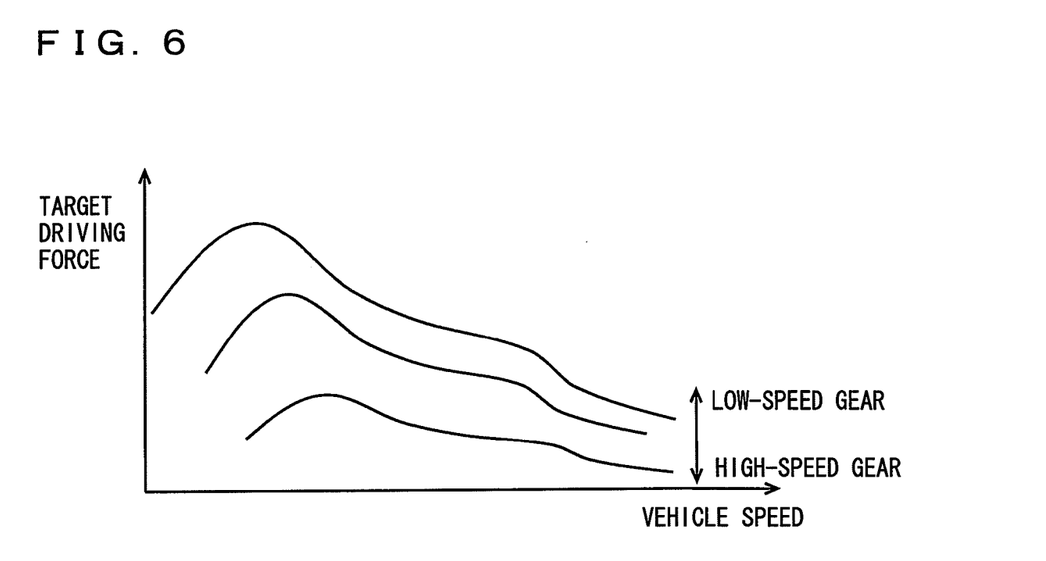
FIG. 6 is a view showing target driving force TF determined for each gear.

Further, when transmission 300 is controlled to shift down, correction unit 722 corrects target driving force TF calculated to be changed continuously, to be increased in a stepwise manner. As shown in FIG. 6, target driving force TF suitable for a multi-speed transmission varies depending on the gear, that is, the gear ratio. Therefore, target driving force TF is corrected to be increased by an amount of increase according to the gear ratio of transmission 300.

In addition, after correction unit 722 corrects target driving force TF to be increased at time T5 shown in FIG. 5, correction unit 722 corrects target driving force TF such that target driving force TF after correction matches target driving force TF before correction at time T6. Target driving force TF is also corrected similarly after time T6.

Figure 7:
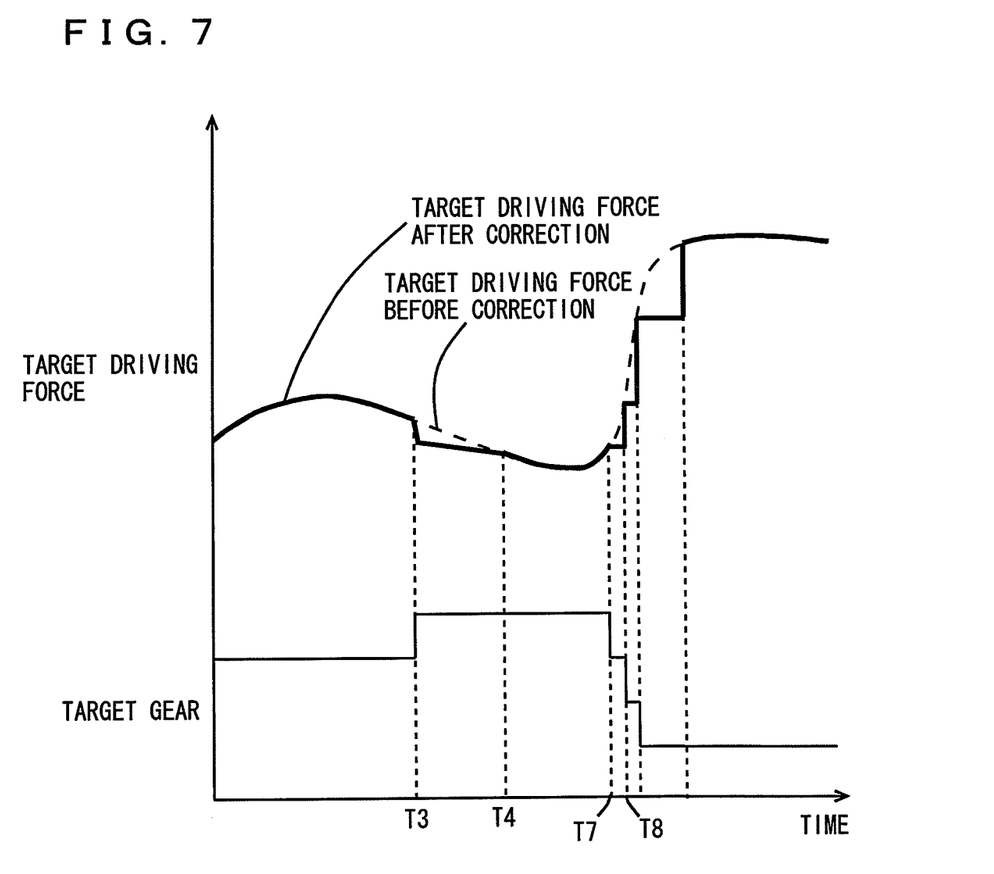
FIG. 7 is a view showing target driving force TF (part 2).

It is to be noted that, as shown in FIG. 7, when transmission 300 is controlled to shift down, correction unit 722 may correct target driving force TF such that an amount of increase of target driving force TF is decreased, in order to maintain target driving force TF before down-shifting after down-shifting. For example, correction unit 722 may correct target driving force TF such that the amount of increase of target driving force TF is decreased by an increase in target driving force TF due to an increase in the accelerator position before down-shifting.

Further, after correction unit 722 corrects target driving force TF such that the amount of increase of target driving force TF is decreased at time T7 shown in FIG. 7, correction unit 722 may correct target driving force TF such that target driving force TF after correction matches target driving force TF before correction at time T8. Target driving force TF is also corrected similarly after time T8.

Turning back to FIG. 3, multi-speed transmission control unit 724 controls transmission 300 according to target gear TG. More specifically, multi-speed transmission control unit 724 controls transmission 300 such that an actual gear matches target gear TG. It is to be noted that, since a well-known common technique may be utilized as a method of controlling transmission 300 as a multi-speed transmission, the detailed description thereof will not be repeated here.

As described above, the modules used for engine control unit 702, target driving force calculation unit 712, conversion unit 714, and target gear ratio calculation unit 716 on the control system are used in common in the case where transmission 300 is a multi-speed transmission and in the case where transmission 300 is a continuously variable transmission. Therefore, development efficiency can be improved.

Figure 8:
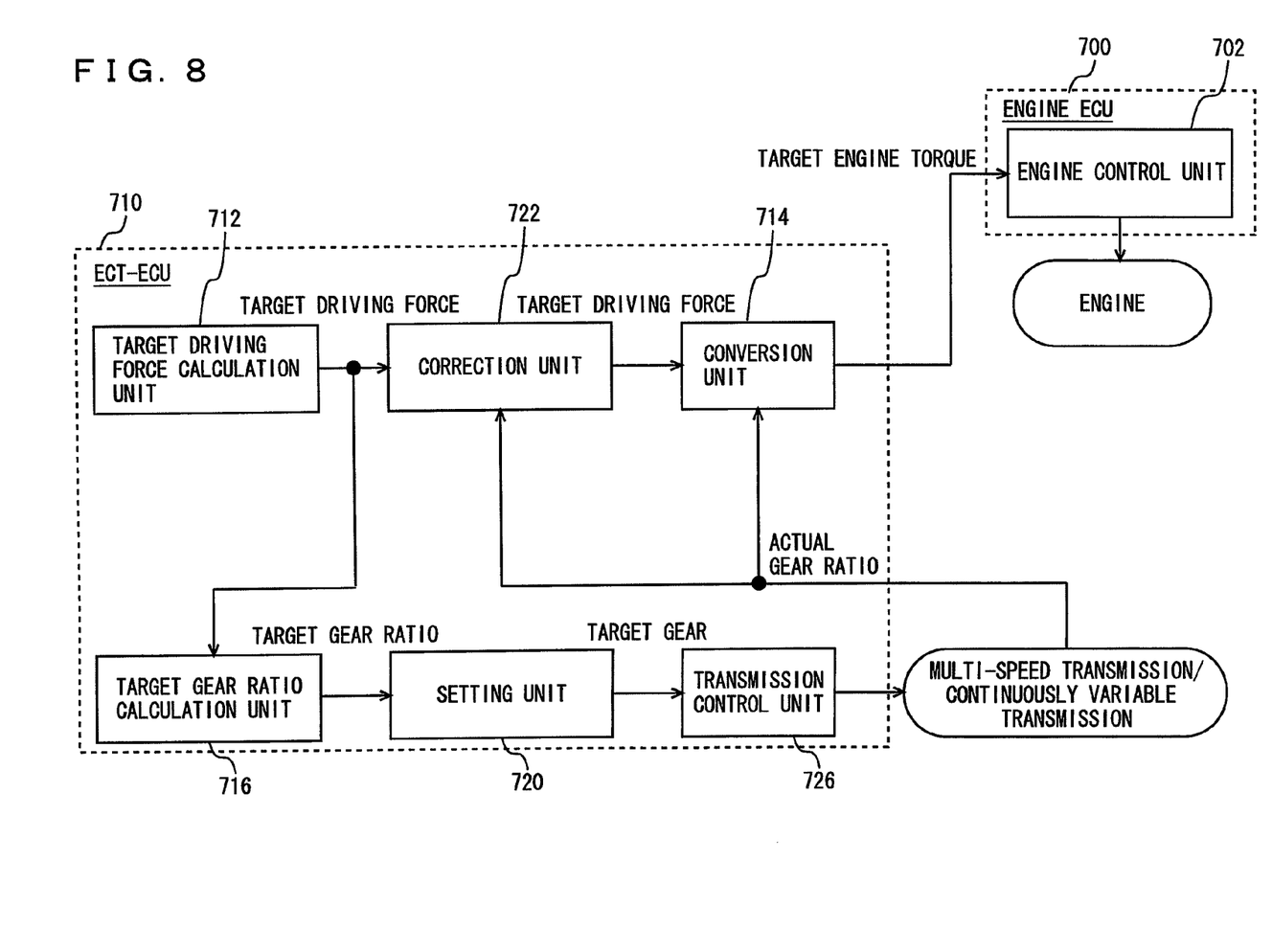
FIG. 8 is a functional block diagram showing a configuration of a control system used regardless of whether a transmission is a continuously variable transmission or a multi-speed transmission.

It is to be noted that a configuration as shown in FIG. 8 may be employed in which, regardless of whether transmission 300 is a continuously variable transmission or a multi-speed transmission, engine control unit 702 is implemented in engine ECU 700, and target driving force calculation unit 712, conversion unit 714, target gear ratio calculation unit 716, setting unit 720, correction unit 722, and a transmission control unit 726 are implemented in ECT-ECU 710, and if transmission 300 is a continuously variable transmission, activation of setting unit 720 and correction unit 722 is inhibited. For example, the activation of setting unit 720 and correction unit 722 is inhibited by inhibiting compilation of programs in setting unit 720 and correction unit 722.

If the activation of correction unit 722 is inhibited, conversion unit 714 converts target driving force TF calculated by target driving force calculation unit 712, instead of corrected target driving force TF, into target engine torque TTE or target turbine torque TTT according to the gear ratio of transmission 300.

Further, if the activation of setting unit 720 is inhibited, transmission control unit 726 controls the continuously variable transmission such that a gear ratio of the continuously variable transmission matches target gear ratio TGR, or such that an input revolution speed of the continuously variable transmission matches target input revolution speed TNI. If the activation of setting unit 720 is not inhibited, transmission control unit 726 controls the multi-speed transmission such that a gear of the multi-speed transmission matches target gear TG.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

The invention claimed is:

1. A control device for a vehicle equipped with a driving source and a transmission coupled to said driving source, comprising:
    a first calculation unit that calculates one of a target gear ratio and a target input revolution speed of said transmission;
    a setting unit that sets a target gear of said transmission according to one of said target gear ratio and said target input revolution speed;
    a first control unit that controls said transmission such that a gear of said transmission matches said target gear;
    a second calculation unit that calculates target driving force of said vehicle;
    a correction unit that corrects said target driving force according to a gear ratio of said transmission;
    a conversion unit that converts the corrected target driving force into target torque that is one of output torque of said driving source and input torque of said transmission according to the gear ratio of said transmission; and
    a second control unit that controls said driving source according to said target torque.

2. The control device for a vehicle according to claim 1, wherein said transmission is a multi-speed transmission.

3. The control device for a vehicle according to claim 1, wherein said setting unit sets said target gear according to one of said target gear ratio and said target input revolution speed, to have hysteresis.

4. The control device for a vehicle according to claim 1, wherein said setting unit sets said target gear according to one of said target gear ratio and said target input revolution speed, such that said target gear is changed if an amount of change of one of said target gear ratio and said target input revolution speed after shifting of said transmission exceeds a threshold value.

5. The control device for a vehicle according to claim 4, wherein said threshold value in a case where one of said target gear ratio and said target input revolution speed is increased is different from said threshold value in a case where one of said target gear ratio and said target input revolution speed is decreased.

6. The control device for a vehicle according to claim 1, wherein said setting unit sets said target gear according to one of said target gear ratio and said target input revolution speed, such that said target gear is changed if an amount of change of at least one of an accelerator position and a vehicle speed after shifting of said transmission exceeds a threshold value.

7. The control device for a vehicle according to claim 6, wherein said threshold value in a case where one of said target gear ratio and said target input revolution speed is increased is different from said threshold value in a case where one of said target gear ratio and said target input revolution speed is decreased.

8. The control device for a vehicle according to claim 1, wherein said setting unit sets said target gear according to one of said target gear ratio and said target input revolution speed, such that said target gear is changed if a difference between said target gear ratio and a gear ratio corresponding to said target gear or a difference between said target input revolution speed and an input revolution speed corresponding to said target gear exceeds a threshold value.

9. The control device for a vehicle according to claim 8, wherein said threshold value is changed according to at least one of a vehicle speed, an accelerator position, said target gear ratio, and said target input revolution speed.

10. The control device for a vehicle according to claim 1, wherein, when said transmission is controlled to shift up, said correction unit corrects said target driving force to be decreased.

11. The control device for a vehicle according to claim 10, wherein, after said correction unit corrects said target driving force to be decreased, said correction unit corrects said target driving force such that the target driving force after correction matches the target driving force before correction.

12. The control device for a vehicle according to claim 11, wherein, after said correction unit corrects said target driving force to be decreased, said correction unit corrects said target driving force such that the target driving force after correction is decreased as an accelerator position lowers, and matches the target driving force before correction.

13. The control device for a vehicle according to claim 1, wherein, when said transmission is controlled to shift down, said correction unit corrects said target driving force to be increased.

14. The control device for a vehicle according to claim 13, wherein said correction unit corrects said target driving force to be increased by an amount of increase according to the gear ratio of said transmission.

15. The control device for a vehicle according to claim 13, wherein, after said correction unit corrects said target driving force to be increased, said correction unit corrects said target driving force such that the target driving force after correction matches the target driving force before correction.

16. The control device for a vehicle according to claim 1, wherein, when said transmission is controlled to shift down, said correction unit corrects said target driving force such that an amount of increase of said target driving force is decreased.

17. The control device for a vehicle according to claim 16, wherein, after said correction unit corrects said target driving force such that the amount of increase of said target driving force is decreased, said correction unit corrects said target driving force such that the target driving force after correction matches the target driving force before correction.

18. The control device for a vehicle according to claim 1, wherein
said transmission is a continuously variable transmission,
activation of said setting unit is inhibited,
said first control unit controls said continuously variable transmission such that a gear ratio of said continuously variable transmission matches said target gear ratio, or such that an input revolution speed of said continuously variable transmission matches said target input revolution speed,
activation of said correction unit is inhibited, and
said conversion unit converts the target driving force calculated by said second calculation unit, instead of the target driving force corrected by said correction unit, into the target torque that is one of the output torque of said driving source and the input torque of said transmission according to the gear ratio of said continuously variable transmission.

19. A control method for a vehicle equipped with a driving source and a transmission coupled to said driving source, comprising the steps of:
calculating one of a target gear ratio and a target input revolution speed of said transmission;
setting a target gear of said transmission according to one of said target gear ratio and said target input revolution speed;
controlling said transmission such that a gear of said transmission matches said target gear;
calculating target driving force of said vehicle;
correcting said target driving force according to a gear ratio of said transmission;
converting the corrected target driving force into target torque that is one of output torque of said driving source and input torque of said transmission according to the gear of said transmission; and
controlling said driving source according to said target torque.

20. A control device for a vehicle equipped with a driving source and a transmission coupled to said driving source, comprising:
first calculation means for calculating one of a target gear ratio and a target input revolution speed of said transmission;
setting means for setting a target gear of said transmission according to one of said target gear ratio and said target input revolution speed;
first control means for controlling said transmission such that a gear of said transmission matches said target gear;
second calculation means for calculating target driving force of said vehicle;
correction means for correcting said target driving force according to a gear ratio of said transmission;
conversion means for converting the corrected target driving force into target torque that is one of output torque of said driving source and input torque of said transmission according to the gear of said transmission; and second control means for controlling said driving source according to said target torque.

* * * * *